Figure 1:
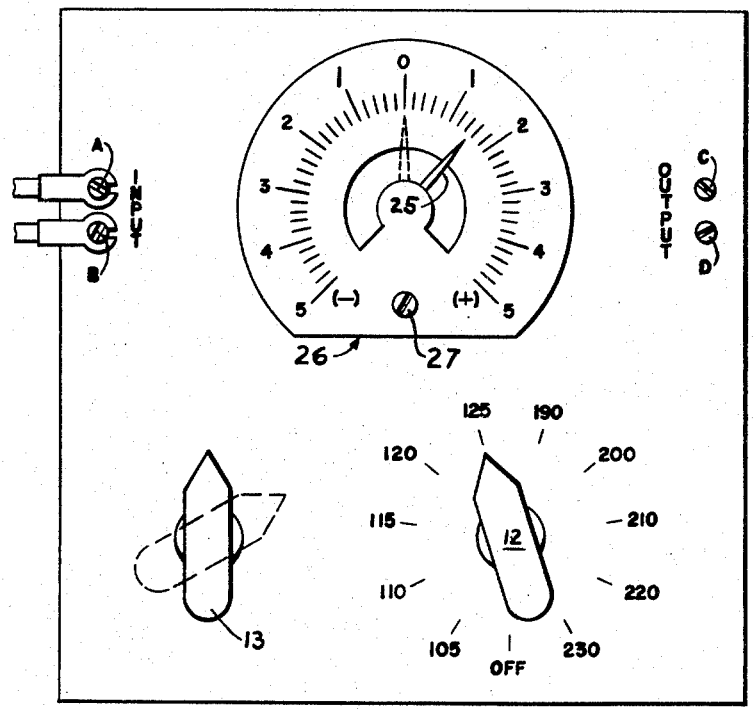

Feb. 10, 1959     A. BRUNO ET AL     2,873,428

EXPANDED SCALE VOLTMETER

Filed Aug. 11, 1953

INVENTORS.
ANTHONY BRUNO
HERBERT GALMAN

BY *H. E. Thibodeau, A. W. Dew*
*and H. J. Forman*

ATTORNEYS

United States Patent Office 2,873,428
Patented Feb. 10, 1959

2,873,428
EXPANDED SCALE VOLTMETER

Anthony Bruno and Herbert Galman, Philadelphia, Pa.

Application August 11, 1953, Serial No. 373,696

7 Claims. (Cl. 324—131)

(Granted under Title 35, U. S. Code (1952), sec. 266)

The invention described herein may be manufactured and used by or for the Government for governmental purposes without the payment of any royalty thereon.

This invention relates to alternating current measurement systems and in particular to instruments for use in monitoring alternating current voltages.

In the course of work with engine generating units and their voltage regulators, it was found that available voltmeters were inadequate for monitoring purposes due to the relatively small pointer displacement for slight variations in the monitored voltage. By means of our invention, however, a substantially full scale pointer deflection for relatively small changes in the monitored voltage may be obtained independently of power frequencies. Provision is also made for adapting the meter for use over a wide range of voltages and for adjusting the deflection sensitivity of the meter. By connecting a recorder to terminals provided in the meter circuit, a permanent record of all voltage variations in any period may be obtained.

An object of this invention, therefore, is to provide an alternating current meter system for monitoring purposes which will detect slight voltage changes and reflect such changes by a substantial deflection of an indicator forming a part of the system.

A further object of this invention is to provide an alternating current meter for voltage monitoring purposes which will operate independently of power frequencies.

An additional object of this invention is to provide an A. C. meter having adjustable deflection sensitivity for voltage monitoring purposes which may be selectively adapted for use over a wide voltage range.

A still further object of this invention is to provide a sensitive A. C. voltage monitoring meter which may be used in conjunction with a recorder to produce a permanent record of voltage fluctuations.

Another object of this invention is to provide basic circuitry which may be used in conjunction with an isolating amplifier to measure high impedance and low power electronic circuits.

In fulfillment of the aforementioned objects of this invention, an alternating current, voltage monitoring circuit, including a voltage sensitive bridge, a phase sensitive demodulator responsive to the output of the bridge and a meter responsive to the balance of the demodulator, is provided and so arranged as to readily detect minor variations in voltage within any desired range of voltages.

Figure 2:
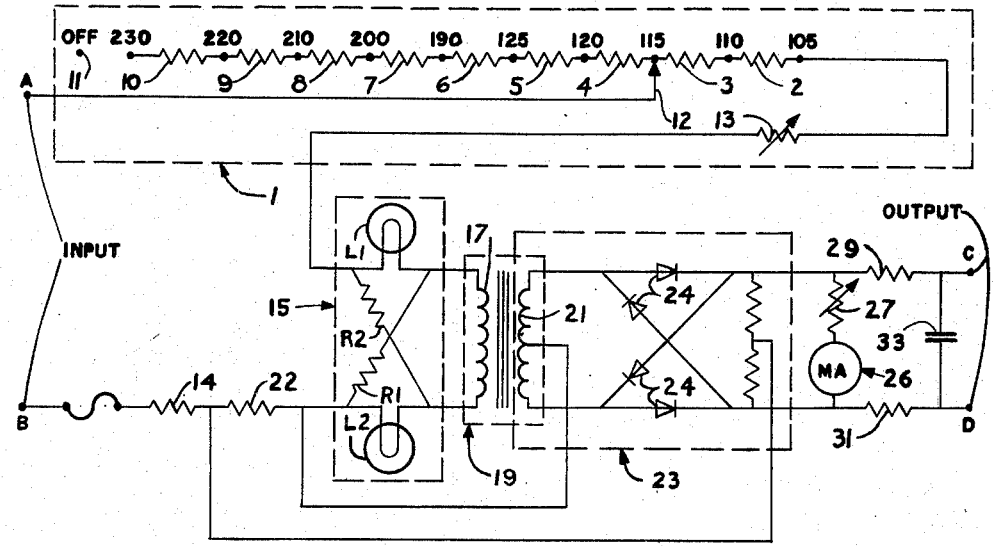

All of the foregoing as well as other objects and advantages of the invention will become apparent from a study of the following specification, taken in conjunction with the accompanying drawings, wherein like characters of reference indicate corresponding parts throughout the several views and wherein:

Fig. 1 is a front plan view of a preferred form of measuring instrument in accordance with the present invention showing two positions of the pointer and fine adjustment knob, and Fig. 2 is a schematic diagram of the meter circuitry employed in the meter shown in Fig. 1.

Although the meter circuit is capable of use in any desired voltage range, the meter circuit and component parts herewith shown and described are, for purposes of illustration, intended to monitor voltages from 105 to 130 and 190 to 230 volts across the input terminals A, B.

The meter circuit, as schematically represented in Fig. 2, employs or makes use of several major components; namely, a resistance selector 1, an A. C. bridge 15, a transformer 19, a phase sensitive demodulator 23 and a milliammeter 26.

The resistance selector 1, which constitutes the range selector of the meter, consists of a selector switch 12, a series of fixed dropping resistances, 2 to 10 inclusive, an "off" terminal 11 and a variable resistance 13. In the range between 105 and 125 volts, four 50 ohm, 1 watt resistors 2, 3, 4, 5 are used in series to provide step settings in 5 volt increments. In order to extend the range of the meter to monitor higher voltages between 190 and 230 volts, a 650 ohm, 2 watt resistor 6 is provided to bridge the range of voltages from 130 to 190 volts and four 100 ohm, 2 watt resistances 7, 8, 9, 10, are provided to produce 10 volt increments within the desired range. By means of the selector switch 12 any number of these resistances 2 to 10 may be placed in series in the circuit to thus selectively monitor any voltage within the range of the meter, in five-volt steps from 105 to 130 volts and in ten-volt steps from 190 to 230 volts. The variable resistance 13 is provided for fine adjustment to monitor any voltage having a value between two of the designated steps provided by the broad selector switch 12.

The alternating current bridge 15, which senses or detects the voltage fluctuation is composed of two tungsten filament lamps L1, L2 and two wire wound resistors R1, R2 in opposite legs of the bridge circuit. Tungsten lamps are preferably used in the circuit since they rise to a very high temperature when normal voltage is applied; thus, a small change in current, due to a change in voltage, will, because of the temperature coefficient of resistance of tungsten, produce an appreciable change in lamp resistance. This high sensitivity to current change results in increased output from the bridge for any voltage fluctuation across the input terminals A, B. Equivalent advantages of increased bridge output may be obtained by using any other non-linear (non-ohmic) element in place of the tungsten lamps, should such a substitution be found desirable. The wire wound resistors R1, R2 are preferably precision resistors (relatively unaffected by ambient temperatures); however, should still additional output from the bridge 15 be desired, non-linear elements may be substituted for the precision resistors, such elements having a temperature coefficient of resistance (variation of resistance relative to temperature) opposite to that of the tungsten lamps L1, L2.

The bridge will balance at the one voltage when the resistances of the lamps L1, L2, and the resistors R1, R2 are equal, or, when the resistance ratios $$\frac{L1}{R1}$$

and $$\frac{R2}{L2}$$

are equal. In the case of alternating currents, the output of the bridge will be of one phase if the bridge input voltage is lower than the balance voltage, and of the opposite phase if higher; the amplitude will increase with the digression of the bridge from its balance. With the control knob of the variable resistance 13 in the vertical position (in the middle of its range) and the selector switch 12 at the 105 volt setting, the lamp bridge circuit is designed to balance at 100 ma. Using 105 volt, 10 watt tungsten lamps (L1, L2) and 800 ohm, 10 watt precision resistors (R1, R2), the sensitivity of the bridge is of the order of one tenth of a volt per volt across the bridge.

The output of the alternating current bridge 15 is fed to the primary winding 17 of a transformer 19 to supply the secondary winding thereof with an induced current. If desired, a step-up transformer may be used for this purpose, and it will additionally serve to further amplify the voltage fluctuations.

The secondary winding 21 of the transformer 19 constitutes a part of a conventional phase-sensitive demodulator circuit 23, utilizing copper-oxide rectifiers 24, and to which the induced (transformed) bridge output is supplied. The reference voltage for the demodulator is taken from the voltage drop across a resistor 22 in series with the input terminal B, whereby the demodulator is effective to sense the phase and magnitude of unbalance in the bridge circuit.

Connected across the output terminals of, and driven by, the demodulator 23 is a standard size 1 milliampere, 270°, zero center scale (.5-0-.5), meter 26 having a pointer 25, for indicating the fluctuations of the monitored voltage. In series with the milliammeter 26 is a rheostat 27 which is used to "zero" or calibrate the meter. The nine series dropping resistances, 2 to 10 inclusive, the variable resistance 13 and a calibrating resistance 14 at the input side of the bridge serve to bring the pointer 25 to center scale for any monitored voltage within the range of the meter so that the bridge always "looks into" 105 volts. In other words, the bridge is designed to balance at 105 volts, the resistance selector 1 serving to reduce the monitored voltage to that value. Upon selection and insertion of a resistance necessary to drop the monitored voltage to 105 volts, the circuit will balance and the pointer 25 will assume its center scale position. A subsequent change in the voltage being monitored will accordingly change the voltage drop across the bridge, upsetting the initially established balance thereof, and will cause the pointer 25 to move away from its center scale position. The extent of the change in the monitored voltage will be reflected by the extent of the off-center movement of the pointer 25. The indications of the meter are linear and the smallest divisions (about 1/8") read voltage changes of .2%; changes of .02% are thus easily estimated for steady voltages.

In some fields of application, it may be found desirable to connect the meter circuit to a graphic recorder (not shown) to obtain a permanent record of the voltage fluctuations in any given period of time. For this purpose, the output terminals C, D are provided as a convenient means for connecting the recorder. To provide for this type of application, a conventional combination of resistors 29, 31 and a condenser 33, connected across the output of the demodulator 23, is used to smooth the output of the circuit.

Operation

The voltage to be monitored is fed to the input terminals A, B. The selector switch 12 is then turned to the position at which the indicating pointer 25 of the meter 26 is closest to its center or zero position. If, for example, the voltage to be monitored is 127 volts, the selector switch is moved to the position shown in Fig. 1, indicating a voltage in the neighborhood of 125 volts.

The pointer will not be at its zero position, but will assume the position shown in full lines in Fig. 1. If the variable resistance 13 were calibrated, the voltage being monitored could be read directly from the dials of the selector switch 12 and the variable resistance 13. However, in the absence of calibrations on the variable resistance 13, with the bar knob turned to the center of its range (the bar knob in vertical, full line, position), the monitored voltage can be determined by the positions of the selector switch 12 and the pointer 25.

By rotating the bar knob of the variable resistance 13 to the position shown in broken lines, the pointer is brought to rest at its zero position on the scale (as shown in broken lines). Having selected the proper resistance values for the voltage to be monitored, as evidenced by the zero positions of the meter pointer 25, balance of the bridge is effected. In view of this balance, there is no current flow in the bridge circuit and, hence there is no current induced in the secondary winding 21 of the transformer 19. Thus a balance is also maintained in the demodulation circuit 23.

If, however, a fluctuation occurs in the monitored voltage after having set the meter, the balance of the bridge circuit will be upset. Depending upon whether the fluctuation is due to an increase or decrease in the monitored voltage, there will be a current output of the bridge of one phase or an opposite phase. The output of the bridge thus induces a current in the secondary winding 21 of the transformer 19, upsetting the balance in the demodulator circuit 23, thereby effecting a deflection of the meter pointer 25. The direction of the pointer deflection is controlled by the phase of the induced current; the phase of the current being dependent upon whether there has been a drop or increase in the monitored voltage. The extent of the deflection of the pointer 25 in the one direction or the other is controlled by the magnitude of the bridge output. Because of the non-linearity of the bridge components even slight fluctuations of the monitored voltage will be detected and indicated by the meter 26. The amplitude of the demodulator reference voltage and the current through the meter 26 are such (as determined by the resistance 22 and the calibrating rheostat 27) that full meter deflection from center or balanced position is obtained by lowering or raising the input voltage 5%.

It will be understood that, by inserting a suitable isolating amplifier at the bridge input, to supply the bridge, this invention may be used to similarly monitor a high impedance and low power source. Because more power is required to operate the bridge than is available from the high impedance and low power source, the isolating amplifier is used to provide power to the bridge with negligible power input to the amplifier from the source.

It will thus be recognized that the meter described is effective to monitor or determine any voltage within its intended range. By replacing the component parts of the meter circuit with parts of proper rating, the range of the meter can be effectively extended, broadened or reduced as may be desired. Obviously, many other and different arrangements may be used within the purview of this invention; for example, the number of dropping resistances (2 to 10) may be increased or decreased to provide any amount of selective positions for the selector switch 12. As a result, it is to be understood that the form of the invention herewith shown and described is to be taken as a preferred example of the same and that changes in the shape, size and arrangement of the parts in addition to preceding, following or interpersion of the invention with vacuum tube circuits for impedance matching and unloading, may be resorted to without departing from the spirit of the invention. It is, therefore, desired that the form disclosed be taken as illustrative and not as limiting. Furthermore, we do not wish the scope of the invention to be limited beyond the limitations which may be imposed by the following claims.

We claim:

1. In an alternating current voltage monitoring system, a normally balanced bridge network including four legs, input terminals for connection with the voltage to be monitored, output terminals, a fixed resistor in each of two of said legs, each fixed resistor respectively being connected between a separate one of said input terminals and a separate one of said output terminals, a non-linear resistance element in each of two others of said legs, each said non-linear resistance element respectively being connected between a separate one of said input terminals and the output terminal associated with the fixed resistor which is connected with the other of said input terminals, a phase-sensitive balanced demodulator including signal voltage input means, a voltage divider having an intermediate tap connected across said input means, output means, a voltage divider having an intermediate tap connected across said output means, said signal voltage input means being connected to said bridge network output terminals, said reference voltage means being connected between said intermediate taps and means connected across said demodulator output means for indicating the fluctuations of the monitored voltage.

2. The invention as defined in claim 1 wherein said non-linear resistance elements comprise tungsten filament lamps, said lamps being responsive to produce an appreciable change in resistance as a result of a relatively small change in current.

3. The invention as defined in claim 2 and wherein said system includes a monitoring range selector comprising variable resistance means connected with said other one of said bridge network input terminals.

4. In an alternating current voltage monitoring system, the combination of a normally balanced bridge network including four legs, input terminals for connection with the voltage to be monitored, output terminals, two adjacent legs of said bridge network respectively having a fixed resistor and a non-linear resistance connected in series across said input terminals, two other adjacent legs of said bridge network respectively having a fixed resistor and a non-linear resistance connected in series across said input terminals, the connections between said fixed resistors and said non-linear resistances being connected respectively to different ones of said output terminals, a phase-sensitive balanced demodulator including signal voltage input means, output means, said signal voltage input means being connected with said bridge network output, said reference voltage means being in balanced relationship between the input and output means of said bridge network, and means connected with said demodulator output for indicating the fluctuations of the monitored voltage.

5. Voltage monitoring apparatus comprising a bridge having a non-linear element in at least one leg and having input terminals for connection to the voltage to be monitored and output terminals, voltage dividing means connected to the output terminals of the bridge and having a center tap thereon, a bridge rectifier having input terminals connected to the output terminals of the first bridge and output terminals indicating means connected to the last said output terminals, voltage dividing means having a center tap connected to the output terminals of the bridge rectifier and means connected with said center taps and the input voltage for applying a voltage between the center taps proportional to the input voltage.

6. Voltage monitoring apparatus comprising a bridge having a non-linear element in at least one leg and having input terminals for connection to the voltage to be monitored and output terminals, voltage dividing means connected to the output terminals of the bridge and having an intermediate tap thereon, a bridge rectifier having input terminals connected to the output terminals of the first bridge and output terminals, indicating means connected to the last said output terminals, voltage dividing means having an intermediate tap connected to the last said output terminals of the bridge rectifier and means connected with said intermediate taps and with the input voltage for applying a voltage between the intermediate taps that is proportional to the input voltage, said intermediate taps being adjustable to produce balanced operation of said bridge rectifier.

7. Voltage monitoring apparatus comprising a bridge having a non-linear element in at least one leg and having input terminals for connection to the voltage to be monitored and output terminals, a phase sensitive balanced demodulator having input terminals connected with the output terminals of said bridge, output terminals on said demodulator, indicating means connected with said demodulator output terminals, means for producing a reference voltage proportional to the voltage being monitored, a first terminal interconnected with the input terminals to said demodulator and electrically disposed intermediate of said demodulator input terminals, a second terminal electrically connected with the demodulator output terminals and electrically disposed intermediate said demodulator output terminals and means connecting said reference voltage between said first and second terminals.

References Cited in the file of this patent

UNITED STATES PATENTS

| | | |
|---|---|---|
| 2,189,660 | Boudreau | Feb. 6, 1940 |
| 2,414,318 | Middel | Jan. 14, 1947 |
| 2,432,199 | Kamm | Dec. 9, 1947 |
| 2,562,912 | Hawley | Aug. 7, 1951 |
| 2,649,715 | Goble | Aug. 25, 1953 |
| 2,747,161 | Dreyer et al. | May 22, 1956 |

FOREIGN PATENTS

| | | |
|---|---|---|
| 770,781 | France | Sept. 20, 1934 |
| 582,307 | Great Britain | Nov. 12, 1946 |